United States Patent

[11] 3,566,729

| [72] | Inventor | Karl Paul Menn |
| | | Ingbert-Saar, Germany |
| [21] | Appl. No. | 760,599 |
| [22] | Filed | Sept. 18, 1968 |
| [45] | Patented | Mar. 2, 1971 |
| [73] | Assignee | Moeller & Neuman G.m.b.H. |
| | | Ingbert-Saar, Germany |
| [32] | Priority | Sept. 21, 1967 |
| [33] | | Germany |
| [31] | | P 16 27 313.5 |

[54] SHEARING LINE FOR METAL SHEETS COMPRISING SLITTING SHEARS FOLLOWED BY CROSS-CUT SHEARS
5 Claims, 2 Drawing Figs.

[52] U.S. Cl. .................................................. 83/105, 83/272, 83/369, 83/408, 83/208
[51] Int. Cl. .................................................. B26d 7/06
[50] Field of Search .................................................. 83/407, 408, 47, 208, 364, 369, 272, 11, 12, 105, 107; 143/37

[56] References Cited
UNITED STATES PATENTS

| 420,095 | 1890 | Pettigrew .................... | 83/272X |
| 1,313,224 | 1919 | Hultberg .................... | 83/105 |
| 3,355,973 | 1967 | Rubinstein et al. ........... | 83/369X |

Primary Examiner—Francis S. Husar
Assistant Examiner—James F. Coan
Attorney—John J. Dennemeyer ABSTRACT: In a shearing line comprising slitting shears (3) for thick sheets two gauges (23) for measuring sheet lengths to be cut are provided in the area of the crosscut shears (5). The gauges are disposed across the width of the sheet and are adapted to operate independent of each other so as to cut a pair of longitudinally divided strips of the sheet simultaneously into equal or different lengths.

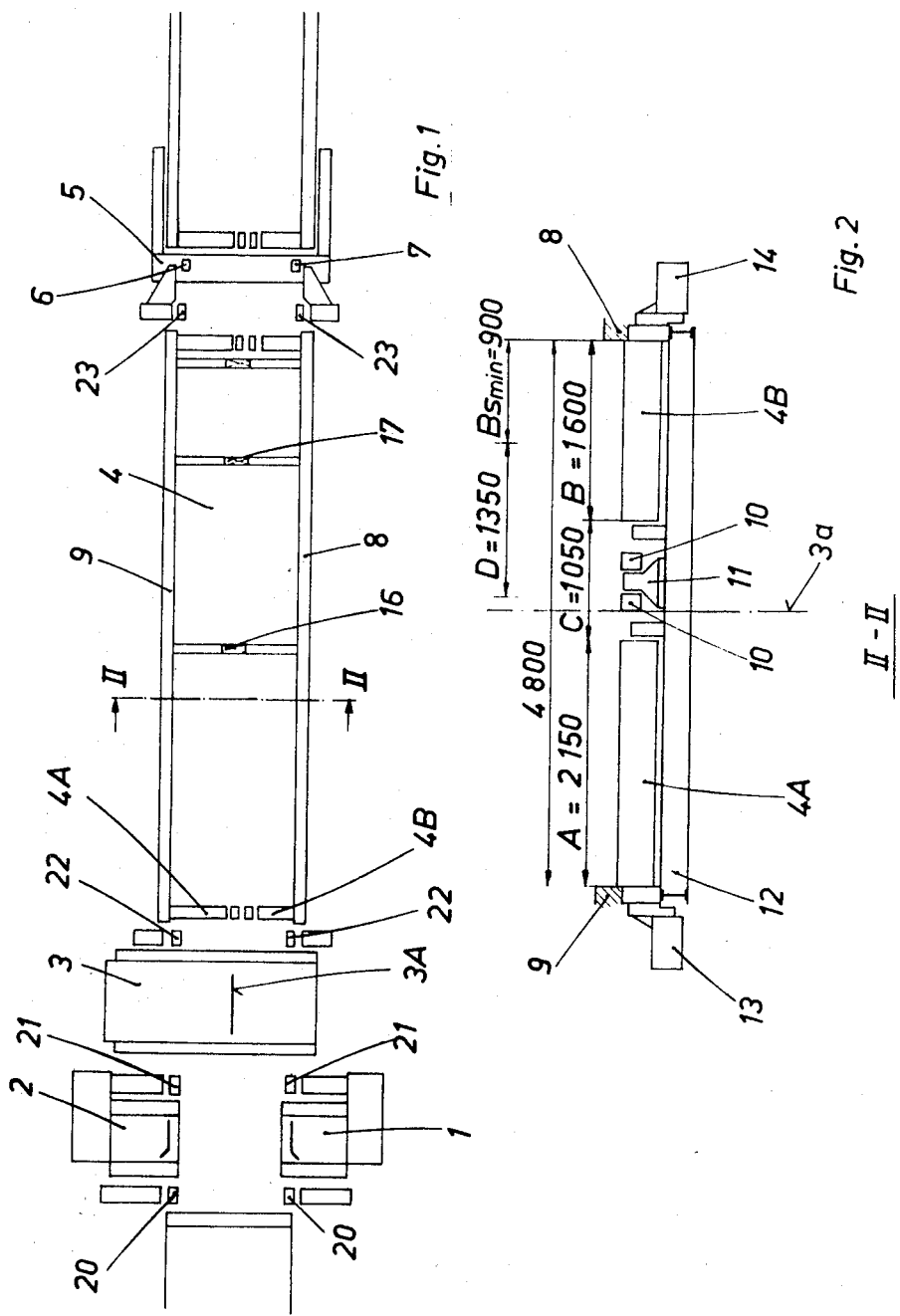

SHEARING LINE FOR METAL SHEETS COMPRISING SLITTING SHEARS FOLLOWED BY CROSS-CUT SHEARS

The invention concerns a shearing line for metal sheets comprising slitting shears mounted ahead of crosscut shears and a device for determining the sheet length to be cut by the crosscut shears, such devices being known as mechanical or electrical gauges. The electrical gauges cooperate either with a contact measuring roller or a measuring carriage which is clamped to the sheets and travels with them. The measuring roller or carriage produce numerical impulses during the advancing of the sheet until the sum has reached a nominal value corresponding to the desired sheet length whereupon the sheet feeding is stopped.

According to the present state of the art the divided sheet halves which may comprise also divided strips of unequal width are conducted one after the other to the crosscut shears. Most often one of the divided strips is lifted from the roller track above the other one by means of pivot arms while the other strip is conducted to the crosscut shears. In view of this only half the production, when operating with the slitting shears, may be passed through the crosscut shears as could be handled if the sheet were not divided or split longitudinally in half. If one considers now that the purpose of slitting shears is, for economic reasons, due to a better use of the oven capacity, better heat conservation, reduced scrap production etc., to roll wider sheets with greater total weight than are required in final size, it will be understood that the hitherto practiced operation of separating divided strips one after the other is actually opposed to the purpose of mounting slitting shears in front of crosscut shears.

It is an object of the present invention to solve the problem mentioned above and to increase the quantity of divided strips passed through the crosscut shears. This is obtained by mounting two gauges across the maximum sheet width and operating independently of each other for a simultaneous crosscutting of the adjacent sheet strips.

The invention is not limited by the sheet thickness and thus not by the type of slitting shears which may be rotary knife or straight knife slitting shears. According to an older suggestion which has not been published one employs as straight knife-slitting shears for greater sheet thickness so-called rolling cut shears, i.e., cradle shears with a curved and a straight cutting knife. However, it is pointed out that the production increase that one strives for is obtained to a greater extent with thick sheets which can be divided longitudinally only by rolling cut shears. This holds true in particular when the sheets are edge trimmed on double edge trimming shears, i.e., with straight knife edge trimming shears mounted in opposition, because these shears installations have already a high through-pass rate per se, as the sheets need be adjusted only once in front of the double edge trimming shears.

In front of the crosscut shears are mounted usually straight edges and guiding devices for adjusting the split strips. The operation of a simultaneous cutting of split strips of the same or different length made possible according to this invention requires that the maximum distance between the straight edges is greater than the maximum sheet width so that the split strips may be drawn apart so as to provide an interval and that the edge of one strip, during its passage through the crosscut shears, is not struck by the stationary edge of the already advanced split strip.

In the case where according to the invention two mechanical gauges are used it may occur sometimes that the rollers of the roller track in front of the crosscut shears against the lower side of the split strip coming to rest in front of the gauge closest to the crosscut shears because the other split strip of the desired greater length must be advanced further through the crosscut shears. In order to avoid this particularly with sensitive sheets the roller track is appropriately divided into two adjacent roller track paths which may be operated independently of each other.

If the roller track paths are of equal width one can produce either only two equally wide sheet halves from a maximum sheet width or both straight edges would have to be moveable wherein the width of the roller track would exceed considerably the maximum sheet width if it is desired to cut from the maximum sheet width split strips of different width. The total roller track width need not exceed a maximum sheet width or exceed it at most by the amount which is required for the mentioned provision of the interval between the split strips, when according to the invention the length of the rollers of the one roller track path corresponds to half the maximum sheet width and between this track path and the second track path having rollers of shorter length an interval remains which is provided preferably with idle rollers, and in this arrangement the cutting line of the slitting shears is adjustable approximately from the center of the total roller track width toward the narrower roller track path.

In that case the straight edges on both sides of the roller track may be stationary. The relationship between the desired maximum and minimum divided width determines the relationship between the shorter roller length and the interval remaining between the two roller track paths, the idle rollers being provided to support the sheet edges in this interval. This will be further explained during the description of the drawing.

The features and advantages of the invention will further appear from the following description made in reference to the accompanying drawings showing a shearing line according to the invention and having double edge trimming shears with rolling cut slitting shears mounted immediately thereafter. In the drawing:

FIG. 1 is a plan view of the shearing line; and

FIG. 2 is a cross section through the roller track in front of the crosscut shears along the line II–II in FIG. 1.

In referring to the drawing it will be seen that the shearing line begins with two oppositely mounted edge trimming shears 1 and 2 of which the shears 1 is stationary and the shears 2 may be moved to the desired edge trimming width. Directly behind the double edge trimming shears 1, 2 is arranged the rolling cut slitting shears 3 with the cutting line 3A and operating in the same rhythm or stroke as the double edge trimming shears. The trimmed sheets, whether longitudinally cut or not advance freely on the contiguous roller track 4 until they are cut transversely by the crosscut shears 5.

Directly in front of the crosscut shears 5 are mounted two measuring rollers 6 and 7 at an interval from each other which allows them to measure by means of a known length-measuring device not specifically illustrated in the drawing, the length of each split strip which advances therealong after a cropping cut of the crosscut shears, each gauge independently, and to determine this length so that with one crosscut two different finished lengths of split strips may be cut.

Instead of the two measuring rollers 6,7 it is obviously possible to provide behind the shears 5 also two independently adjustable mechanical gauges, i.e., abutment stops.

For a more detailed description of the roller track 4 reference is made to FIG. 2 of the drawing. According to this FIG. the roller track has a total usable width of for example 4,800 mm. between the fixed straight edges 8 and 9 for a maximum trimmed sheet width of 4,500 mm. The difference of 300 mm. is provided in order to allow moving the split strips with an interval therebetween when a maximum sheet width is to be split or cut longitudinally.

The roller track 4 is divided into two roller track paths of unequal width, namely on the side of the straight edge 9 is a roller track path A = 2,150 mm. comprising the rollers 4A of greater length, and on the side of the straight edge 8 is the roller track path B = 1,600 mm. with the shorter length rollers 4B. Between them lies an interval C = 1,050 mm. with two idle rollers 10 which are journaled in a bearing block 11. The roller track rollers are supported on frames 12 and driven by motors 13,14 which may be actuated independently of each other.

Having the dimension C = 1,050 mm. for the intermediate space or interval between the two roller track paths A and B it is predetermined which maximum split width may be produced from a maximum sheet width of 4,500 mm. namely A + C = 3,200 mm. less a safety gap of, e.g., 200 mm. Only this split width could —supported by the idle rollers 10 —be fed independently by the roller track path B. For this purpose the cutting line 3A of the slitting shears 3 would have to be moved to the right toward the narrower rolling track path B. The other split strip has in that case a width of B = 1,600 mm. less a safety margin of 100 mm.

When the minimum split width is to be $B_{Smin} = 900$ mm. it is necessary to move the cutting line 3A of the slitting shears 3 by the amount D = 1,350 mm. toward the straight edge 8 or the narrower rolling track path B in case the other split strip is to be as wide as possible. Since according to what has been said it could be at most equal to A + C = 3,000 mm. approximately, the minimum split width $B_{Smin}$ = 900 mm. is to be paired at most with a split width of 3,000 mm., i.e., the maximum sheet width for this is 3,000 + 900 = 3,900 mm.

These limit values of possible pairs of edging strips as well as intermediate values may be seen from the following table:

| Trimmed sheet width | Possible split sheet widths |
| --- | --- |
| 4,500 mm. | 2 × 2,250 to 3,000 + 1,500 mm. |
| 4,000 mm. | 2 × 2,000 to 3,000 + 1,000 mm. |
| 3,900 mm. | 2 × 1,950 to 3,000 + 900 mm. |
| 3,800 mm. | 2 × 1,750 to 2,600 + 900 mm. |

A high acceleration of the sheets through the double edge trimming shears-slitting shears unit 1,2,3 is obtained by the driven roller pairs 20, 21 and 22. For the same purpose driven roller pairs 23 are also provided in front of the crosscut shears 5.

The operation of the shearing line according to the invention is as follows: the unsplit sheets as well as the right split strip travel along the straight edge 8 associated with the stationary edge trimming shears 1 and need not be adjusted anymore in front of the crosscut shears 5. A left split strip is deviated after leaving the slitting shears 3 by means of deflection devices 16,17 against the straight edge 9 of the loose side and thus adjusted. Subsequently both split strips are inserted together into the crosscut shears 5 to the extent necessary to allow a cropping cut.

With the cropping cut the length measuring device is set to zero so that the length measurement starts with the advance of the split sheets by means of the measuring rollers 6,7 in contact with the sheet surfaces.

In case split strips of different length are to be produced different nominal values are set in the mutually independent electrical impulse counters of the two measuring rollers 6,7 the nominal values representing impulse sums corresponding to the desired sheet lengths. Now both roller track paths A and B may be actuated and the two split strips advanced simultaneously. The motors 13,14 as well as the drivers 23 are laterally put successively out of operation as the set nominal values of the desired sheet lengths are reached by the counter impulses of the measuring rollers 6 or 7, this being done manually when the nominal-actual value comparison is carried out optically, or automatically when the gauge motors of comparison devices —eventually during transition to a creeping speed —are shut down.

I claim:

1. A shearing line for metal sheets comprising, in combination, shear means for slitting an advancing metal sheet longitudinally into a pair of split strips, means for feeding a metal sheet to be split to said slitting shear means, crosscut shear means for transverse cutting of said split strips simultaneously, track means for advancing each of said split strips independently of each other in laterally spaced relationship, length sensing means operatively associated with each of said split strips for independently controlling the advance of each of said split strips by said track means, each of said length sensing means being adjustable to advance a predetermined length of each of said strips through said crosscut shear means for said simultaneous cutting of said strips into selected lengths.

2. A shearing line in accordance with claim 1 wherein said track means includes a pair of laterally spaced substantially parallel tracks having rollers, means for driving the rollers in each of said tracks independently of each other, the adjacent side edges of said tracks defining therebetween a longitudinally extending interval.

3. A shearing line in accordance with claim 2 wherein the rollers of one of said tracks are of greater length than the rollers of the other of said tracks to thereby provide independently operable roller track paths of differing widths.

4. A shearing line in accordance with claim 3 wherein said splitting shear means are laterally adjustable to provide a cutting line for said metal sheet extending from the center line of said track means towards said other track.

5. A shearing line in accordance with claim 4 including idle rollers positioned within said interval between said tracks for supporting the edge portions of said advancing strips, longitudinally extending straight edges associated with each of said tracks for guiding the advance of said split strips and at least one deflection device for moving said split strips laterally apart onto said tracks against the associated straight edges.